US011387875B2

(12) United States Patent
Karakkad Kesavan Namboodiri

(10) Patent No.: US 11,387,875 B2
(45) Date of Patent: Jul. 12, 2022

(54) BEAM SELECTION FOR ENHANCED PAGE PERFORMANCE

(71) Applicant: QUALCOMM Incorporated, San Diego, CA (US)

(72) Inventor: Vishnu Namboodiri Karakkad Kesavan Namboodiri, Hyderabad (IN)

(73) Assignee: QUALCOMM INCORPORATED, San Diego, CA (US)

( * ) Notice: Subject to any disclaimer, the term of this patent is extended or adjusted under 35 U.S.C. 154(b) by 57 days.

(21) Appl. No.: 16/917,463

(22) Filed: Jun. 30, 2020

(65) Prior Publication Data

US 2021/0328639 A1    Oct. 21, 2021

(51) Int. Cl.
*H04W 72/04* (2009.01)
*H04B 7/06* (2006.01)
*H04W 76/28* (2018.01)
*H04L 5/00* (2006.01)
*H04L 43/16* (2022.01)
*H04W 16/28* (2009.01)
*H04W 24/04* (2009.01)
*H04W 24/08* (2009.01)
*H04W 68/02* (2009.01)
*H04B 17/318* (2015.01)
*H04B 17/336* (2015.01)

(52) U.S. Cl.
CPC ......... *H04B 7/0608* (2013.01); *H04L 5/0048* (2013.01); *H04L 43/16* (2013.01); *H04W 16/28* (2013.01); *H04W 24/04* (2013.01); *H04W 24/08* (2013.01); *H04W 68/02* (2013.01); *H04W 76/28* (2018.02); *H04B 17/318* (2015.01); *H04B 17/336* (2015.01)

(58) Field of Classification Search
CPC .. H04B 7/0608; H04B 17/318; H04B 17/336; H04W 16/28; H04W 68/02; H04W 24/04; H04W 24/08; H04W 76/28; H04L 43/16; H04L 5/0048

See application file for complete search history.

(56) References Cited

U.S. PATENT DOCUMENTS

| | | | |
|---|---|---|---|
| 2012/0052828 A1* | 3/2012 | Kamel | H04B 17/104 455/226.2 |
| 2017/0251518 A1* | 8/2017 | Agiwal | H04W 76/28 |
| 2017/0373731 A1* | 12/2017 | Guo | H04B 7/0404 |
| 2018/0020382 A1* | 1/2018 | Kim | H04W 8/22 |

(Continued)

FOREIGN PATENT DOCUMENTS

EP    3618301 A1    3/2020

OTHER PUBLICATIONS

International Search Report and Written Opinion—PCT/US2021/023284—ISA/EPO—dated Jun. 8, 2021.

*Primary Examiner* — Hassan Kizou
*Assistant Examiner* — Mahbubul Bar Chowdhury
(74) *Attorney, Agent, or Firm* — Loza & Loza, LLP

(57) ABSTRACT

A wireless communication device can selectively perform a beam switch upon performing a power-up operation based on the criticality of the beam switch. The wireless communication device can switch from a previously serving downlink beam to a new downlink beam either during or after a paging time window based on beam measurements obtained for the previously serving downlink beam and the new downlink beam. Other aspects, features, and embodiments are also claimed and described.

30 Claims, 12 Drawing Sheets

(56) References Cited

U.S. PATENT DOCUMENTS

| | | | |
|---|---|---|---|
| 2018/0027522 A1* | 1/2018 | Lee | H04W 72/0413 |
| | | | 370/336 |
| 2019/0045481 A1* | 2/2019 | Sang | H04B 1/713 |
| 2019/0254110 A1* | 8/2019 | He | H04L 5/0048 |
| 2019/0261287 A1* | 8/2019 | Deenoo | H04W 24/08 |
| 2020/0015313 A1* | 1/2020 | Reial | H04L 5/0098 |
| 2020/0374960 A1* | 11/2020 | Deenoo | H04W 72/14 |
| 2021/0037397 A1* | 2/2021 | Guo | H04L 5/0023 |

* cited by examiner

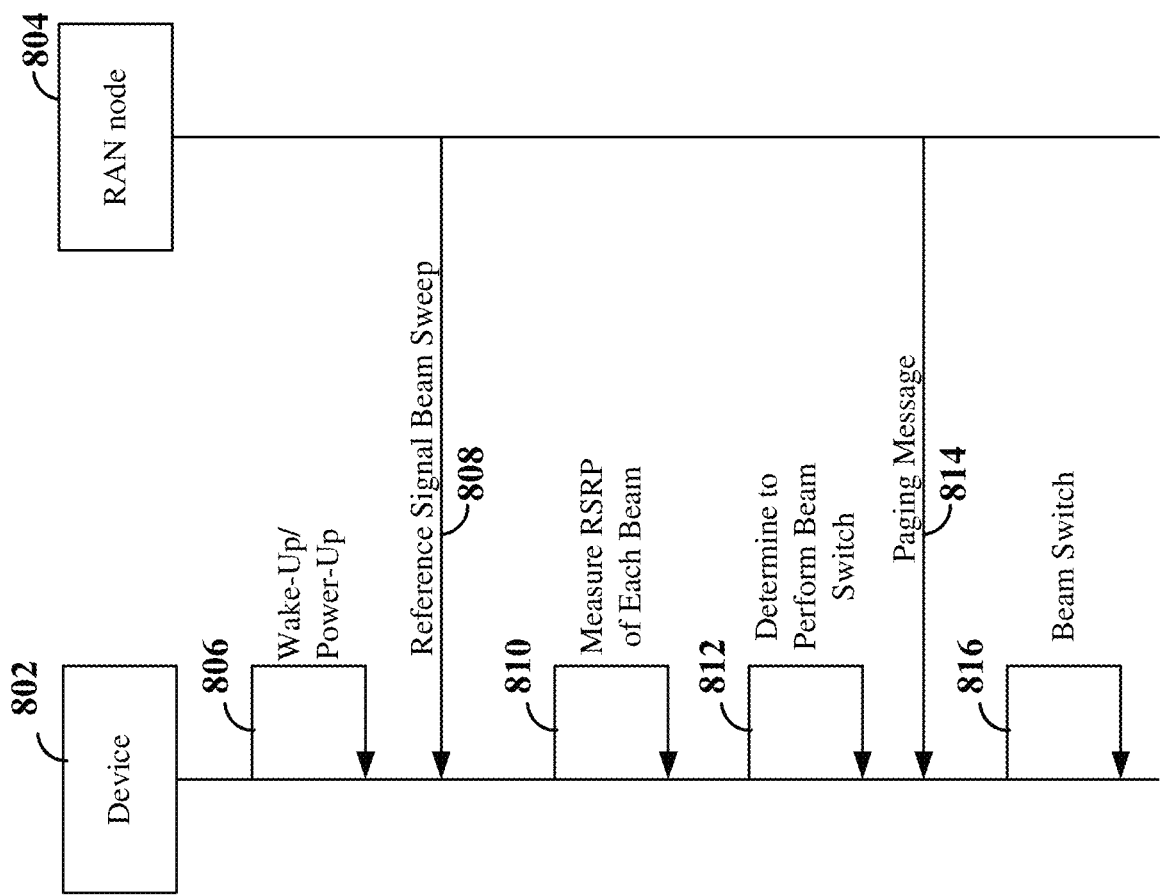

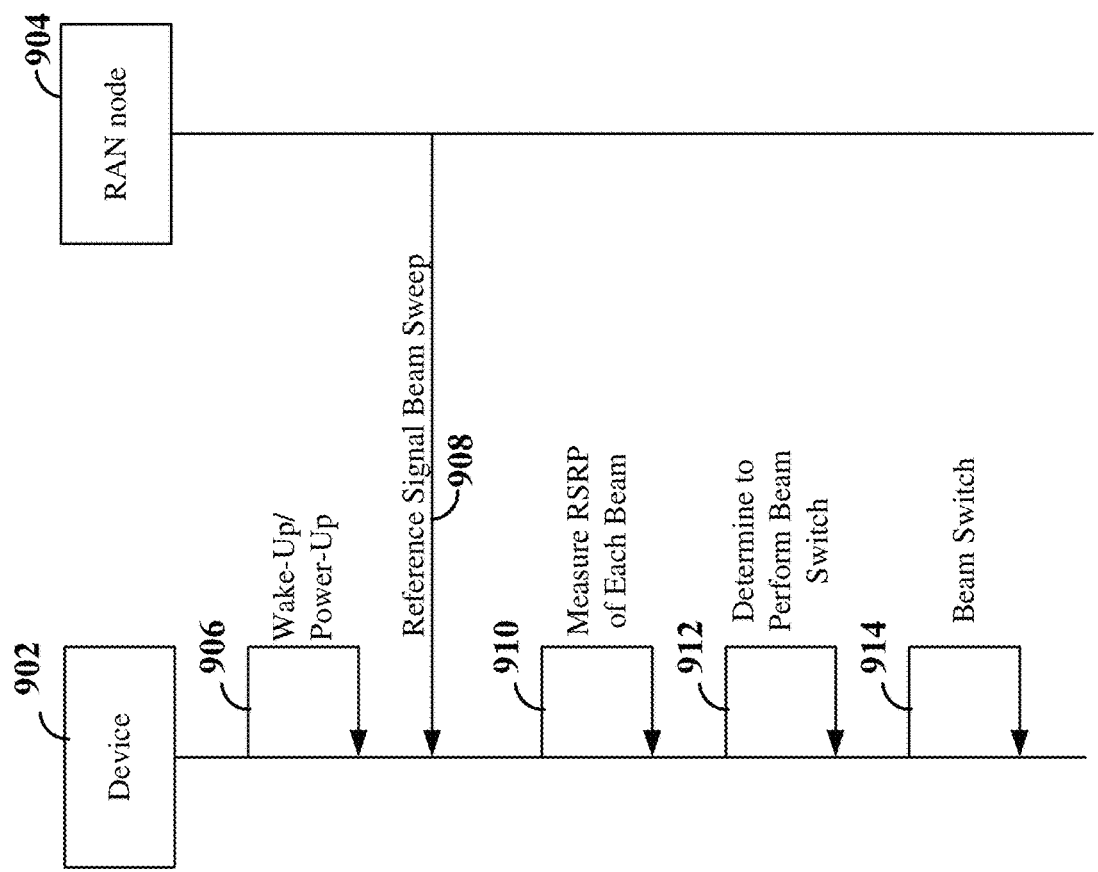

BEAM SELECTION FOR ENHANCED PAGE PERFORMANCE

PRIORITY CLAIM

This application claims priority to and the benefit of Indian Application No. 202041016479 filed in the Indian Patent Office on Apr. 16, 2020, the entire content of which is incorporated herein by reference as if fully set forth below in its entirety and for all applicable purposes.

TECHNICAL FIELD

The technology discussed below relates generally to wireless communication networks, and more particularly, to beam selection in beam-based communication scenarios (e.g., milli-meter wave beams). Some embodiments and techniques enable and provide communication devices, methods, and systems with techniques for enhancing page performance when performing a beam switch.

INTRODUCTION

In wireless communication systems, such as those specified under standards for 5G New Radio (NR), a base station and user equipment (UE) may utilize beamforming to compensate for high path loss and short range. Beamforming is a signal processing technique used with an antenna array for directional signal transmission and/or reception. Each antenna in the antenna array transmits a signal that is combined with other signals of other antennas of the same array in such a way that signals at particular angles experience constructive interference while others experience destructive interference.

The UE may select a downlink beam on which to receive broadcast communications, such as paging messages, from the base station when the UE is in a discontinuous reception (DRX) idle mode. The DRX idle mode allows the UE to remain in a low-power state, such as a sleep mode, for a period of time. The UE may periodically wake-up (e.g., perform a power-up operation) to receive a page on the selected downlink beam.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

Various aspects of the disclosure relate to a wireless communication device selectively performing a beam switch upon performing a power-up operation based on the criticality of the beam switch. The wireless communication device can switch from a previously serving downlink beam to a new downlink beam either during or after a paging time window based on beam measurements obtained for the previously serving downlink beam and the new downlink beam. For example, the wireless communication device can perform the beam switch after the paging time window when the beam measurement of the previously serving downlink beam is greater than a first threshold and a difference between the beam measurements of the previously serving downlink beam and the new downlink beam is greater than a second threshold. The wireless communication device can further perform the beam switch during the paging time window the beam measurement of the previously serving downlink beam is less than the first threshold.

In one example, a method for wireless communication at a wireless communication device in a wireless communication network is disclosed. The method can include performing a power-up operation of the wireless communication device in an idle mode, and obtaining a plurality of beam measurements. Each of the beam measurements can be associated with a respective downlink beam of a plurality of downlink beams utilized for communication with a radio access network (RAN) node. The method may also include switching from a first downlink beam of the plurality of downlink beams previously utilized for communication with the RAN node to a second downlink beam of the plurality of downlink beams after a paging time window. The switching can occur when a first beam measurement of the plurality of beam measurements associated with the first downlink beam is greater than a first threshold and a difference between the first beam measurement and a second beam measurement of the plurality of beam measurements associated with the second downlink beam is greater than a second threshold.

Another example provides a wireless communication device in a wireless communication network including a wireless transceiver, a memory, and a processor communicatively coupled to the wireless transceiver and the memory. The processor and the memory can be configured to perform a power-up operation of the wireless communication device in an idle mode, and obtain a plurality of beam measurements. Each of the beam measurements can be associated with a respective downlink beam of a plurality of downlink beams utilized for communication with a radio access network (RAN) node. The processor and the memory may further be configured to switch from a first downlink beam of the plurality of downlink beams previously utilized for communication with the RAN node to a second downlink beam of the plurality of downlink beams after a paging time window. The switching can occur when a first beam measurement of the plurality of beam measurements associated with the first downlink beam is greater than a first threshold and a difference between the first beam measurement and a second beam measurement of the plurality of beam measurements associated with the second downlink beam is greater than a second threshold.

Another example provides a wireless communication device in a wireless communication network. The wireless communication device can include means for performing a power-up operation of the wireless communication device in an idle mode, and means for obtaining a plurality of beam measurements. Each of the beam measurements can be associated with a respective downlink beam of a plurality of downlink beams utilized for communication with a radio access network (RAN) node. The wireless communication device may also include means for switching from a first downlink beam of the plurality of downlink beams previously utilized for communication with the RAN node to a second downlink beam of the plurality of downlink beams after a paging time window. The switching can occur when a first beam measurement of the plurality of beam measurements associated with the first downlink beam is greater than a first threshold and a difference between the first beam measurement and a second beam measurement of the plurality of beam measurements associated with the second downlink beam is greater than a second threshold.

Another example provides a non-transitory computer-readable medium including code for causing a wireless communication device to perform a power-up operation of the wireless communication device in an idle mode, and to obtain a plurality of beam measurements. Each of the beam measurements can be associated with a respective downlink beam of a plurality of downlink beams utilized for communication with a radio access network (RAN) node. The non-transitory computer-readable medium may further include code for causing the wireless communication device to switch from a first downlink beam of the plurality of downlink beams previously utilized for communication with the RAN node to a second downlink beam of the plurality of downlink beams after a paging time window. The switching can occur when a first beam measurement of the plurality of beam measurements associated with the first downlink beam is greater than a first threshold and a difference between the first beam measurement and a second beam measurement of the plurality of beam measurements associated with the second downlink beam is greater than a second threshold.

Various method, system, device, and apparatus embodiments may also include additional features. For example, the wireless communication device may further be configured to search for the plurality of downlink beams upon completing the power-up operation, and measure a beam reference signal on each of the plurality of downlink beams to obtain the plurality of beam measurements. In some examples, the beam reference signal includes a synchronization signal block (SSB). In some examples, the plurality of beam measurements include reference signal received power (RSRP) measurements, signal-to-interference-plus-noise (SINR) measurements, or reference signal received quality (RSRQ) measurements.

In some examples, the wireless communication device may further be configured to perform the power-up operation during a discontinuous reception (DRX) cycle. In some examples, the wireless communication device may further be configured to select the second threshold. In some examples, the second beam measurement has a highest beam measurement from among the plurality of beam measurements.

In some examples, the wireless communication device may further be configured to switch from the first downlink beam to the second downlink beam during the paging time window when the first beam measurement is less than the first threshold. In addition, the wireless communication device may further be configured to miss a page during the paging time window when switching from the first downlink beam to the second downlink beam occurs during the paging time window. In some examples, the wireless communication device may further be configured to maintain the first downlink beam as a serving downlink beam when the first beam measurement is greater than the first threshold and the difference between the first beam measurement and the second beam measurement is less than the second threshold.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

FIG. 8 illustrates an example of signaling between a wireless communication device and a RAN node according to the non-critical beam switch timing scenario of FIG. 7A.

FIG. 9 illustrates an example of signaling between a wireless communication device and a RAN node according to the critical beam switch timing scenario of FIG. 7B.

DETAILED DESCRIPTION

Figure 1:
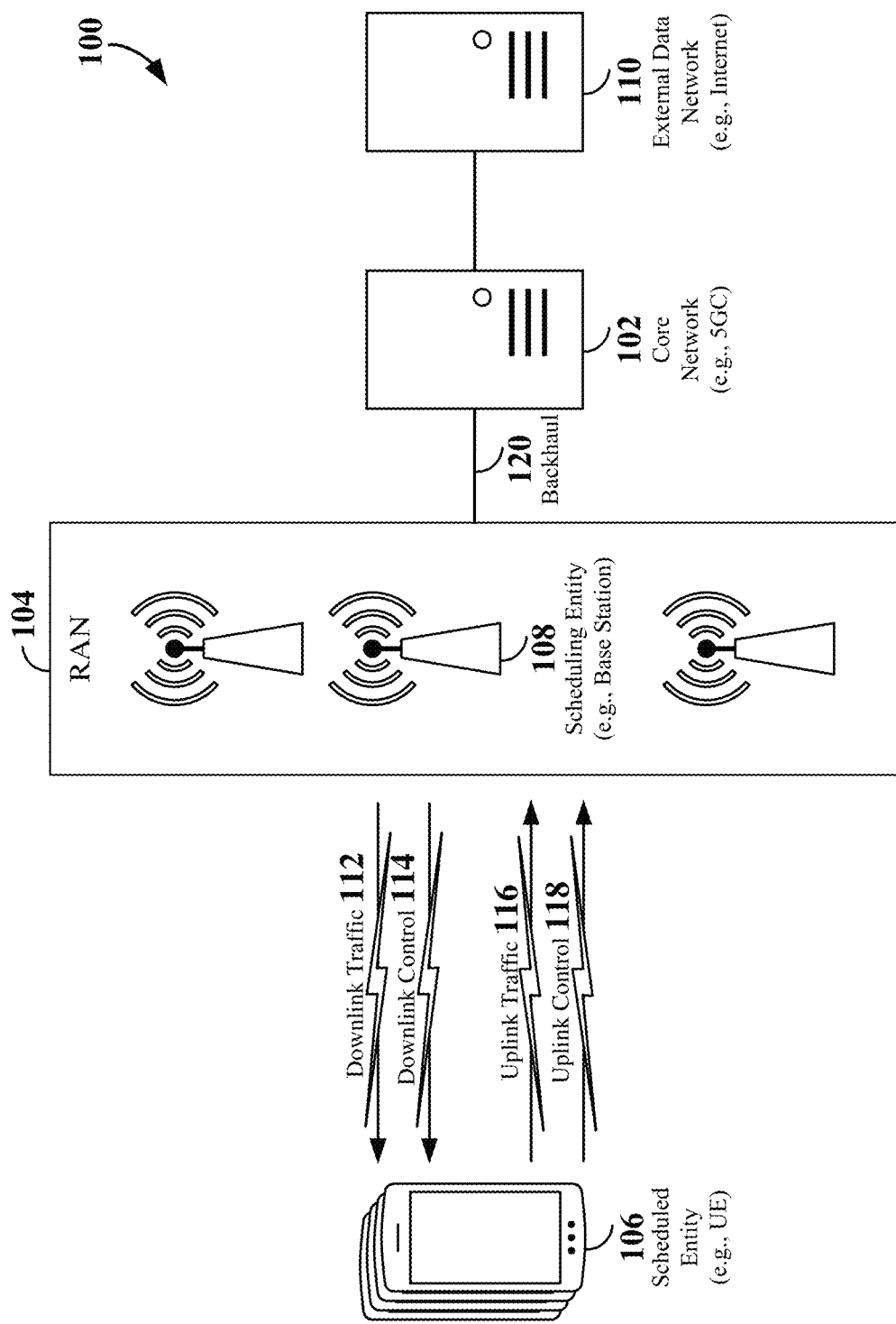
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6

GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
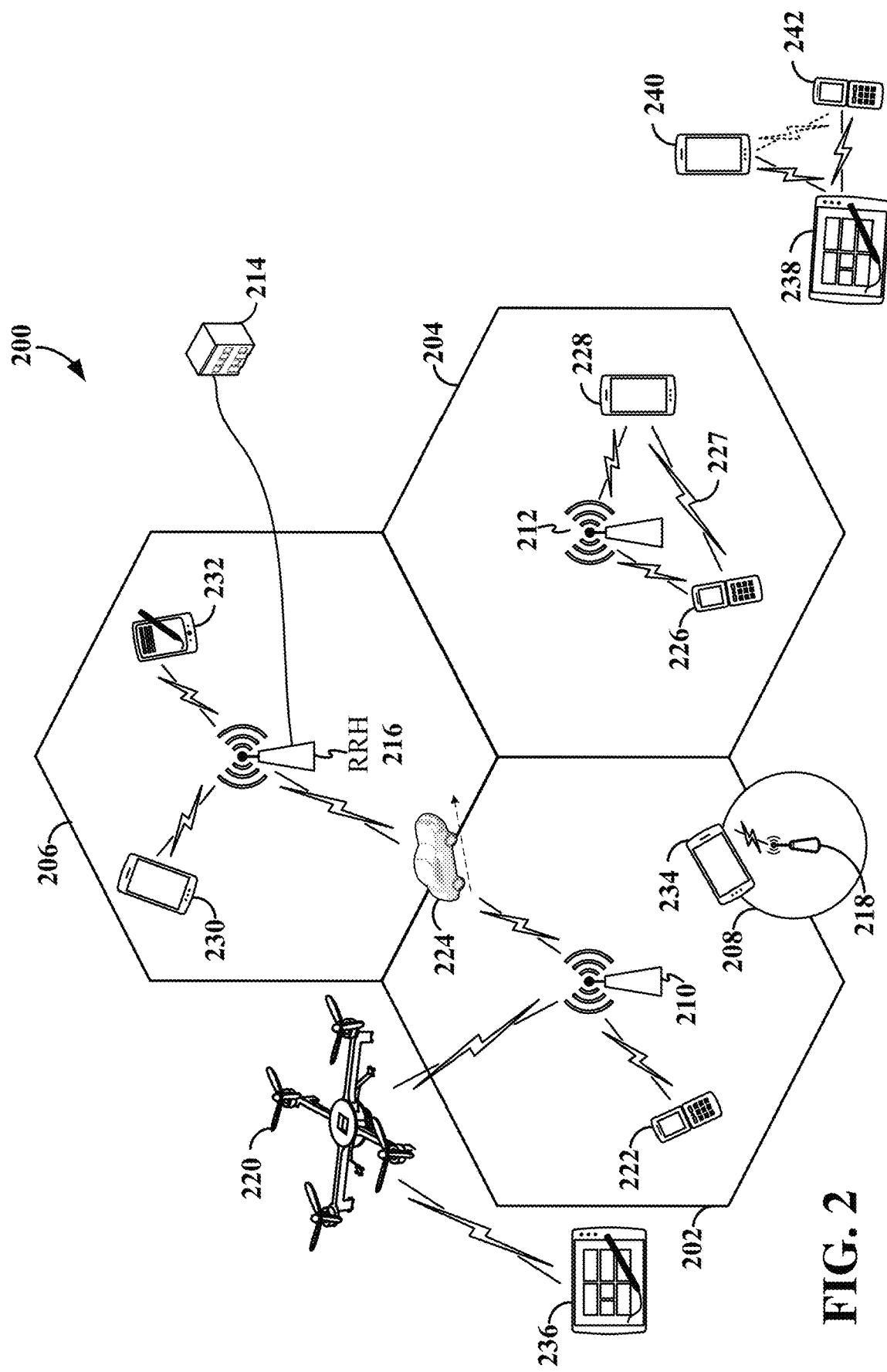
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218.

In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D), peer-to-peer (P2P), vehicle-to-vehicle (V2V) network, and/or vehicle-to-everything (V2X). For example, two or more UEs (e.g., UEs 226 and 228) within the coverage area of a serving base station 212 may communicate with each other using sidelink signals 227 without relaying that communication through the base station. In this example, the base station 212 or one or both of the UEs 226 and 228 may function as scheduling entities to schedule sidelink communication between UEs 226 and 228. In some examples, the sidelink signals 227 include sidelink traffic and sidelink control. In a further example, UEs outside the coverage area of a base station may communicate over a sidelink carrier. For example, UE 238 is illustrated communicating with UEs 240 and 242. Here, the UE 238 may function as a scheduling entity or a transmitting sidelink device, and UEs 240 and 242 may each function as a scheduled entity or a receiving sidelink device.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier I-DMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
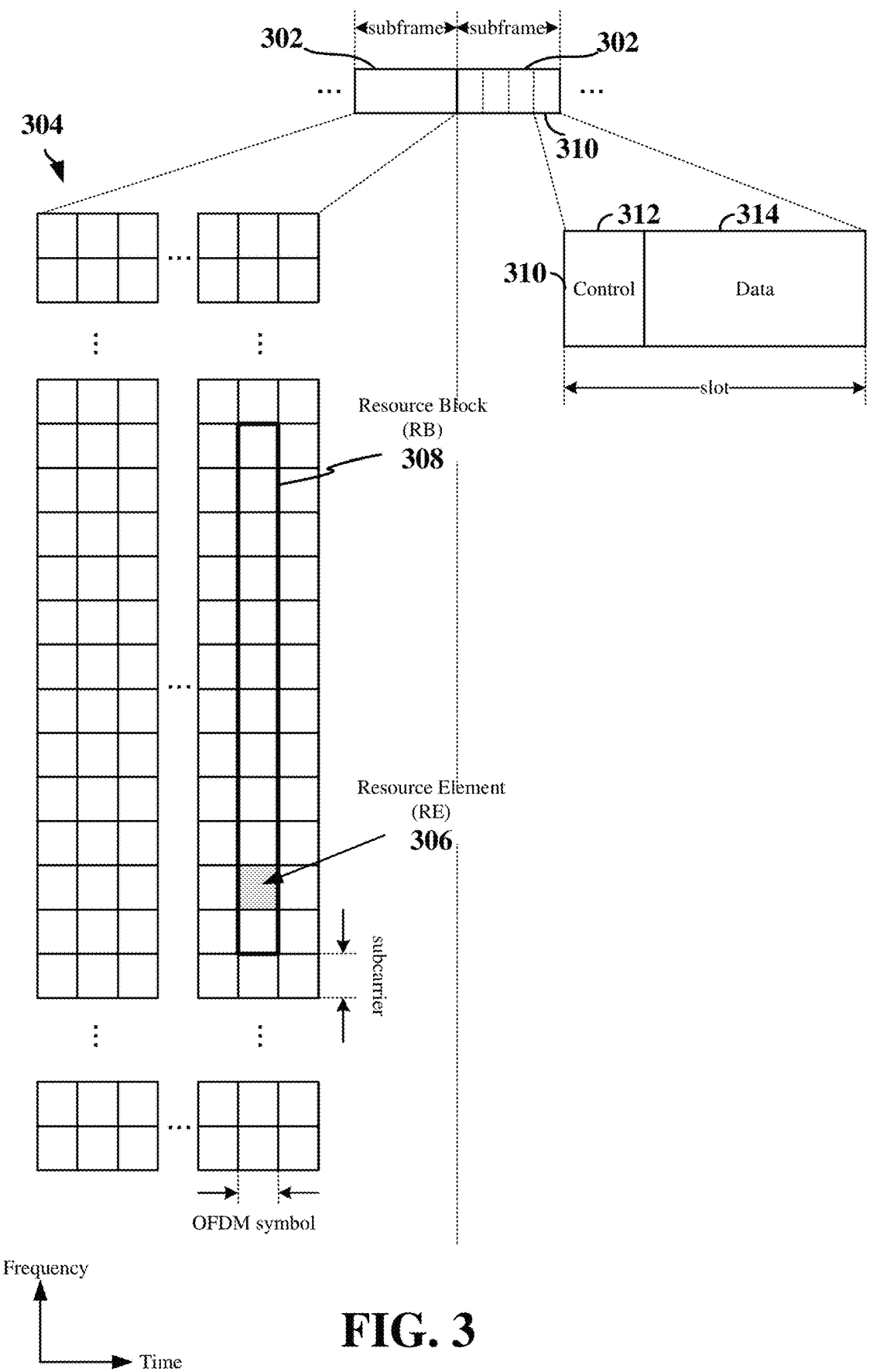
FIG. 3 is a diagram illustrating an example of a frame structure for use in a radio access network according to some aspects.

Referring now to FIG. 3, an expanded view of an exemplary DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is merely exemplary in nature, and different slot structures may be utilized, and may include one or more of each of the control region(s) and data region(s).

In some examples, the slot 310 may be utilized for broadcast or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 306 (e.g., within the control region 312) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 306 (e.g., in the control region 312 or the data region 314) to carry other DL signals, such as a demodulation reference signal (DMRS); a phase-tracking reference signal (PT-RS); a channel state information (CSI) reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell. The synchronization signals PSS and SSS, and in some examples, the PBCH and a PBCH DMRS, may be transmitted in a synchronization signal block (SSB). The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 306 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 306 (e.g., within the data region 314) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry other signals, such as one or more SIBs and DMRSs.

In an example of sidelink communication over a sidelink carrier via a PC5 interface, the control region 312 of the slot 310 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 314 of the slot 310 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 306 within slot 310. For example, HARQ feedback information may be transmitted in a physical sidelink feedback channel (PSFCH) within the slot 310 from the receiving sidelink device to the transmitting sidelink device. In addition, one or more reference signals, such as a sidelink SSB and/or a sidelink CSI-RS, may be transmitted within the slot 310.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
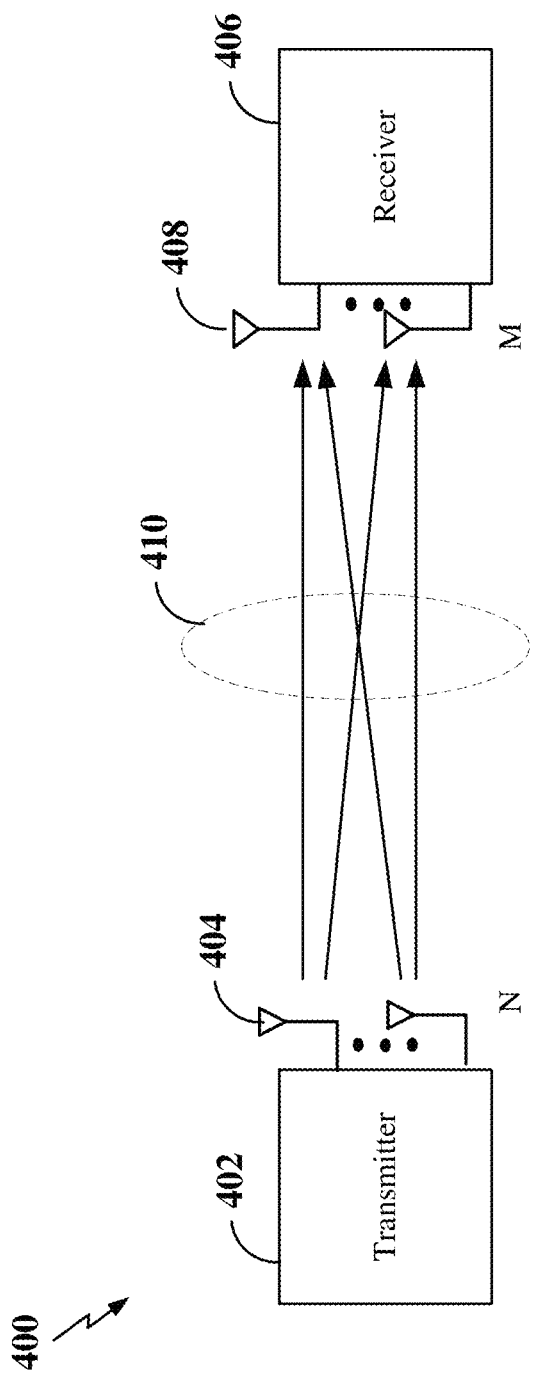
FIG. 4 is a block diagram illustrating a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 400 is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

A base station (e.g., gNB) may generally be capable of communicating with UEs using beams of varying beam widths. For example, a base station may be configured to utilize a wider beam when communicating with a UE that is in motion and a narrower beam when communicating with a UE that is stationary. In some examples, to select a particular beam for communication with a UE, the base station may transmit a reference signal, such as an SSB or CSI-RS, on each of a plurality of beams in a beam-sweeping manner. The UE may measure the reference signal received power (RSRP) on each of the beams and transmit a beam measurement report to the base station indicating the RSRP of each of the measured beams. The base station may then select the particular beam for communication with the UE based on the beam measurement report. In other examples, when the channel is reciprocal, the base station may derive the particular beam to communicate with the UE based on uplink measurements of one or more uplink reference signals, such as a sounding reference signal (SRS).

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH). However, it should be understood that beamformed signals may also be utilized by enhanced mobile broadband (eMBB) gNBs for sub-6 GHz systems.

Figure 5:
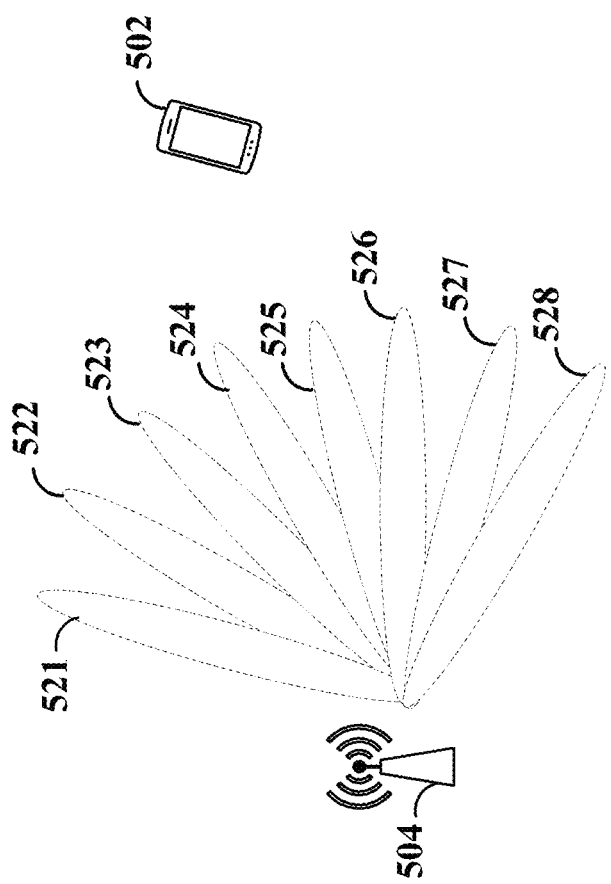
FIG. 5 is a diagram illustrating an example of communication between a radio access network (RAN) node and a wireless communication device using beamforming according to some aspects.

FIG. 5 is a diagram illustrating communication between a radio access network (RAN) node 504 and a wireless communication device 502 using downlink beamformed signals according to some aspects of the disclosure. The RAN node 504 may be any of the base stations or scheduling entities illustrated in FIGS. 1 and 2, and the wireless communication device 502 may be any of the UEs or scheduled entities illustrated in FIGS. 1 and 2. It should be noted that while some beams are illustrated as adjacent to one another, such an arrangement may be different in different aspects. In some examples, beams transmitted during a same symbol may not be adjacent to one another. In some examples, the RAN node 504 may transmit more or less beams distributed in all directions (e.g., 360 degrees).

In the example shown in FIG. 5, a beam set contains eight different beams 521, 522, 523, 524, 525, 526, 527, 528, each associated with a different beam direction. In some examples, the RAN node 504 may be configured to sweep or transmit each of the beams 521, 522, 523, 524, 525, 526, 527, 528 during a synchronization slot. For example, the RAN node 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control-control element (MAC-CE) signaling by the gNB), or aperiodically (e.g., as triggered by the gNB via downlink control information (DCI)).

The wireless communication device 502 searches for and identifies the beams based on the beam reference signals. The wireless communication device 502 then performs beam measurements (e.g., RSRP, SINR, RSRQ, etc.) on the beam reference signals to determine the respective beam quality of each of the beams. In examples in which the wireless communication device 502 is in an RRC connected state, the wireless communication device 502 may generate and transmit a beam measurement report, including the respective beam index and beam measurement of each beam 521-528 to the RAN node 504. The RAN node 504 may then determine the downlink beam (e.g., beam 524) on which to transmit unicast downlink control information and/or user data traffic to the wireless communication device 502. In some examples, the selected downlink beam has the highest gain from the beam measurement report. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

In other examples, when the channel is reciprocal (e.g., the downlink and uplink channel qualities are the same), the RAN node 504 may derive a downlink beam. Derivation of the downlink beam can be based on uplink measurements performed by the RAN node 504, such as by measuring the received power, quality, or other variable of a sounding reference signal (SRS) or other uplink reference signal transmitted by the wireless communication device 502. In some examples, the RAN node 504 may derive the downlink beam based on a combination of the beam measurement report and uplink measurements.

In examples in which the wireless communication device 502 is an RRC idle state, the wireless communication device 502 may use the beam measurements to select a downlink beam on which to receive broadcast communications from the RAN node 504. The broadcast communications may include, for example, paging messages transmitted from the RAN node 504 to the wireless communication device 502 when new data arrives for the wireless communication device 502 at the network. In some examples, a paging message may be broadcast by the RAN node 504 over multiple downlink beams. The paging message may then be received by the wireless communication device 502 on the selected downlink beam.

In the RRC idle mode, the wireless communication device 502 may enter a discontinuous reception (DRX) mode (DRX idle mode) to reduce power consumption. The DRX idle mode allows the wireless communication device 502 to remain in a low-power state, such as a sleep mode, for a period of time. The wireless communication device 502 may periodically wake-up (e.g., perform a power-up operation) to receive a page on the selected downlink beam.

Figure 6:
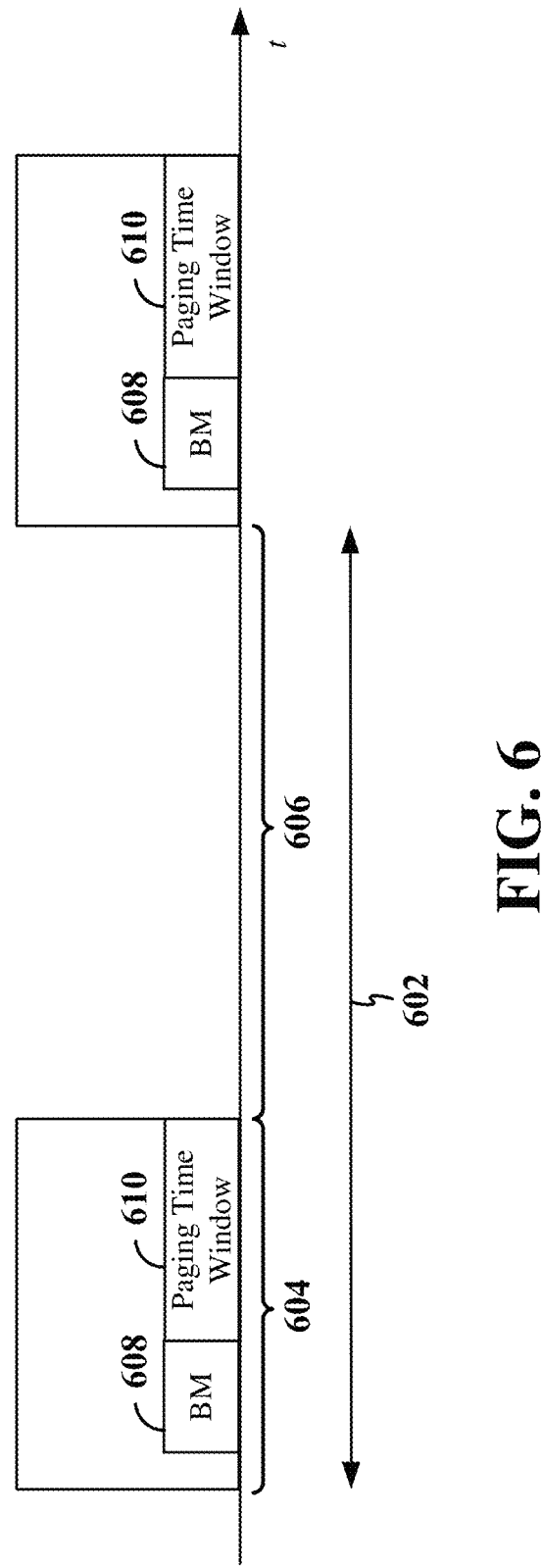
FIG. 6 is a diagram illustrating an example of a discontinuous reception (DRX) idle mode as implemented on a wireless communication device according to some aspects.

FIG. 6 is a diagram illustrating an example of a DRX idle mode as implemented on a wireless communication device according to some aspects. The DRX idle mode is characterized by a number of consecutive DRX cycles 602 in time (t). The duration of each DRX cycle 602 may be set by the network based on one or more DRX parameters, such as a requested DRX cycle length provided by the wireless communication device during an initial attach procedure.

Each DRX cycle 602 includes a DRX ON duration 604 and a DRX OFF duration 606. Here, the DRX cycle length (or DRX cycle duration) is equal to the time between the start of one DRX ON duration 604 and the start of the next DRX ON duration 604. The DRX OFF duration 606 corresponds to a period of inactivity where the wireless communication device does not communicate with the wireless communication network (e.g., the wireless communication device does not transmit any information to or receive any information from the wireless communication network). During the DRX OFF duration 606, the wireless communication device may enter a sleep state or low-power state to reduce power consumption.

Upon entering the DRX ON duration 604, the wireless communication device wakes-up by performing a power-up operation. The wireless communication device may then enter a beam measurement (BM) period 608. During the BM period 608, the wireless communication device searches for and identifies downlink beams using received beam reference signals (e.g., SSB, CSI-RS, etc.). In addition, the wireless communication device performs beam measurements (e.g., RSRP, SINR, RSRQ, etc.) on the beam reference signals to determine the respective beam quality of each of the beams. To facilitate beam search and measurement during the BM period 608, the periodicity of the BM period 608 maps to the beam reference signal periodicity (e.g., SSB transmission periodicity).

Following the BM period 608, the wireless communication network may designate a paging time window 610 within which the wireless communication device may receive a paging message. For example, the paging time window 610 may correspond to a normal paging cycle (e.g., 1.28 seconds) utilized in the wireless communication network. At the end of the paging time window 610, the wireless communication device may again enter a sleep state or low-power state for the DRX OFF duration 606.

In the example shown in FIG. 6, the periodicity of the paging time window 610 is selected to follow the periodicity of the BM period 608. In other examples, the BM period 608 may have a different periodicity that may or may not coincide with the paging time window 610. However, the wireless communication device may suffer a power penalty if the BM period 608 is separated in time from the paging time window 610, thus resulting in an additional DRX ON duration to perform beam search and measurement. Therefore, in various aspects of the disclosure, the BM period 608 occurs during the same DRX ON duration 604 as the paging time window 610 and precedes the paging time window 610 to facilitate beam selection for enhanced page performance.

Based on the beam search and measurements obtained during the BM period 608, the wireless communication device may decide to perform a beam switch from a previous serving downlink beam to a new serving downlink beam. The previous serving downlink beam may correspond to the downlink beam utilized by the wireless communication device in a previous DRX ON duration 604 to receive a paging message from the wireless communication network. The wireless communication device may decide to perform the beam switch when the beam measurements associated with the previous serving downlink beam and new serving downlink beam indicate that the beam quality of the new serving downlink beam is better than the beam quality of the previous serving downlink beam. For example, the wireless communication device may determine that the RSRP of the new serving downlink beam is higher than the RSRP of the previous serving downlink beam, and as such, may decide to perform the beam switch.

A beam switch involves updates to the hardware (e.g., antenna array/panel), followed by a link adaptation convergence period utilizing one or more link adaptation loops. Therefore, the complete beam switch procedure may have an overhead of a few milliseconds. Extending the DRX ON duration 604 to account for a potential beam switch may result in a power penalty to the wireless communication device when a beam switch is not performed. However, a page decode attempt may fail when using a weak serving downlink beam.

Therefore, in various aspects of the disclosure, the wireless communication device can selectively perform a beam switch after performing a power-up operation based on the criticality of the beam switch. The wireless communication device can further determine the timing of the beam switch based on the criticality of the beam switch.

Figure 7A:
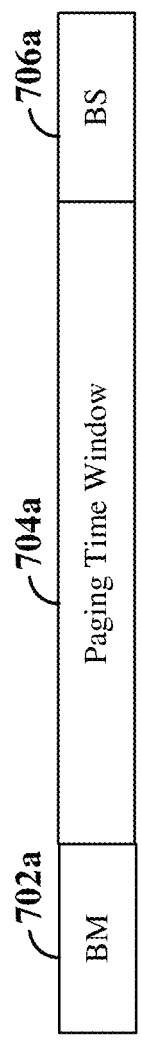
FIGS. 7A and 7B illustrate various beam switch timing scenarios according to some aspects.
Figure 7B:
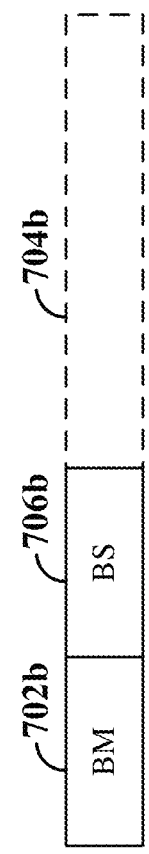

FIGS. 7A and 7B illustrate various beam switch timing scenarios according to some aspects. In both FIGS. 7A and 7B, a wireless communication device may search for and perform beam measurements on a plurality of downlink beams during a respective beam measurement (BM) period 702a and 702b. Each BM period 702a and 702b can occur after a power-up operation is performed upon entering a DRX ON duration of a DRX cycle. The beam measurements may be obtained by measuring the RSRP, SINR, RSRQ, or other suitable measurement of a beam reference signal (e.g., SSB, CSI-RS, etc.) transmitted on each of the identified downlink beams.

The wireless communication device can compare the beam measurement of a previous serving downlink beam with the respective beam measurements of each of the other downlink beams to decide whether to perform a beam switch from the previous serving downlink beam (referred to herein as a first downlink beam) to a second downlink beam. In some examples, the second downlink beam may have a highest beam measurement (e.g., highest RSRP, highest SINR, or highest RSRQ) among all of the downlink beams measured during the BM period 702a. In some examples, the wireless communication device can calculate a difference between a second beam measurement of the second downlink beam and a first beam measurement of the first downlink beam to determine whether to perform the beam switch. For example, the wireless communication device can determine to perform the beam switch when the difference between the second beam measurement and the first beam measurement is greater than a beam difference threshold. The wireless communication device can further maintain the first downlink beam as the serving downlink beam when the difference between the beam measurements of the first and second downlink beams is less than the beam difference threshold (e.g., when there is an insignificant difference in beam quality between the first and second downlink beams) In some examples, the beam difference threshold can be selected by the wireless communication device (e.g., defined on the wireless communication device or dynamically selected based on current channel conditions). In other examples, the beam difference threshold can be selected by the wireless communication network and transmitted to the wireless communication device.

When a beam switch is to be performed, the wireless communication device can select the timing of the beam switch based on the criticality of the beam switch. The criticality of the beam switch can be determined, for example, based on the beam measurement associated with the first downlink beam (previous serving downlink beam). In some examples, the wireless communication device can determine that the beam switch is critical when the first beam measurement of the first downlink beam is below an absolute threshold. The wireless communication device can further determine that the beam switch is non-critical when the first beam measurement of the first downlink beam is above the absolute threshold. The absolute threshold can be defined on the wireless communication device and set to a level (or value) at which the wireless communication device is unable to decode a paging message.

FIG. 7A illustrates a non-critical beam switch timing scenario. In the example shown in FIG. 7A, the wireless communication device can perform a beam switch (BS) 706a after a paging time window 704a. In this example, the wireless communication device can use the first downlink beam to receive a paging message during the paging time window 704a and perform the BS 706a to switch from the first downlink beam to the second downlink beam after the paging time window 704a. FIG. 7B illustrates a critical beam timing scenario. In the example shown in FIG. 7B, the wireless communication device can perform a BS 706b during the paging time window 704b. In this example, the wireless communication device performs the BS 706b immediately upon deciding to perform the BS 706a, and as a result, misses a paging message transmitted to the wireless communication device during the paging time window 704b. However, since the absolute threshold is used as a delimiter for the criticality of the beam switch, the wireless communication device only performs the BS 706b during the paging time window 704b when a page decode attempt would otherwise not be possible.

FIG. 8 illustrates an example of signaling between a wireless communication device (Device) 802 and a RAN node 804 according to the non-critical beam switch timing scenario of FIG. 7A. The wireless communication device 802 may correspond to any of the UEs or scheduled entities shown in FIGS. 1, 2, and/or 5. In addition, the RAN node 804 may correspond to any of the base stations or scheduling entities shown in FIGS. 1, 2, and/or 5.

At 806, the wireless communication device 802 wake-ups and performs a power-up operation while in idle mode. The wireless communication device 802 can perform the power-up operation upon entering the DRX ON duration of a DRX cycle. For example, the wireless communication device 802 may perform a power-up operation of one or more components of the wireless communication device 802 to enable reception and processing of communication signals transmitted by the RAN node 804.

At 808, the RAN node 804 performs a beam sweep to transmit a reference signal (e.g., an SSB or CSI-RS) on each of a plurality of downlink beams to the wireless communication device 802. At 810, the wireless communication device 802 identifies and measures the RSRP or other suitable beam measurement of a respective beam reference signal on each received downlink beam of the plurality of downlink beams.

At 812, the wireless communication device 802 determines to perform a beam switch based on the beam measurements (e.g., RSRPs) of the received downlink beams. In some examples, the wireless communication device 802 can compare the beam measurements of a previous serving downlink beam (first downlink beam) and a second downlink beam having a highest RSRP among the received downlink beams, including the first downlink beam. The wireless communication device 802 can then calculate a difference between a second beam measurement of the second downlink beam and a first beam measurement of the first downlink beam to determine whether to perform the beam switch. For example, the wireless communication device 802 can determine to perform the beam switch when the difference between the second beam measurement and the first beam measurement is greater than a beam difference threshold. The wireless communication device 802 can further determine that the beam switch is non-critical based on the first beam measurement of the first downlink beam. For example, the wireless communication device 802 can determine that the first beam measurement of the first downlink beam is above an absolute threshold.

At 814, the RAN node 804 transmits a paging message to the wireless communication device 802. Using the first downlink beam (the previous serving downlink beam), the wireless communication device 802 receives the paging message and attempts a page decode of the paging message. At 816, the wireless communication device 802 performs the beam switch from the first downlink beam to the second downlink beam. Thus, the wireless communication device 802 performs the beam switch at 816 after a paging time window of the DRX ON duration to enable the wireless communication device 802 to receive and decode the paging message at 814 during the paging time window.

FIG. 9 illustrates an example of signaling between a wireless communication device (Device) 902 and a RAN node 904 according to the critical beam switch timing scenario of FIG. 7B. The wireless communication device 902 may correspond to any of the UEs or scheduled entities shown in FIGS. 1, 2, and/or 5. In addition, the RAN node 904 may correspond to any of the base stations or scheduling entities shown in FIGS. 1, 2, and/or 5.

At 906, the wireless communication device 902 wake-ups and performs a power-up operation while in idle mode. The wireless communication device 902 can perform the power-up operation upon entering the DRX ON duration of a DRX cycle. For example, the wireless communication device 902 may perform a power-up operation of one or more components of the wireless communication device 902 to enable reception and processing of communication signals transmitted by the RAN node 904.

At 908, the RAN node 904 performs a beam sweep to transmit a reference signal (e.g., an SSB or CSI-RS) on each of a plurality of downlink beams to the wireless communication device 902. At 910, the wireless communication device 902 identifies and measures the RSRP or other suitable beam measurement of a respective beam reference signal on each received downlink beam of the plurality of downlink beams.

At 912, the wireless communication device 902 determines to perform a beam switch based on the beam measurements (e.g., RSRPs) of the received downlink beams. In some examples, the wireless communication device 902 can compare the beam measurements of a previous serving downlink beam (first downlink beam) and a second downlink beam having a highest RSRP among the received downlink beams, including the first downlink beam. The wireless communication device 902 can then calculate a difference between a second beam measurement of the second downlink beam and a first beam measurement of the first downlink beam to determine whether to perform the beam switch. For example, the wireless communication device 902 can determine to perform the beam switch when the difference between the second beam measurement and the first beam measurement is greater than a beam difference threshold. The wireless communication device 902 can further determine that the beam switch is critical based on the first beam measurement of the first downlink beam. For example, the wireless communication device 902 can determine that the first beam measurement of the first downlink beam is below an absolute threshold.

At 914, the wireless communication device 902 performs the beam switch from the first downlink beam to the second downlink beam. Thus, the wireless communication device 902 performs the beam switch at 914 during a paging time window of the DRX ON duration, thus preventing the wireless communication device 902 from receiving and decoding a paging message from the RAN node 904.

Figure 10:
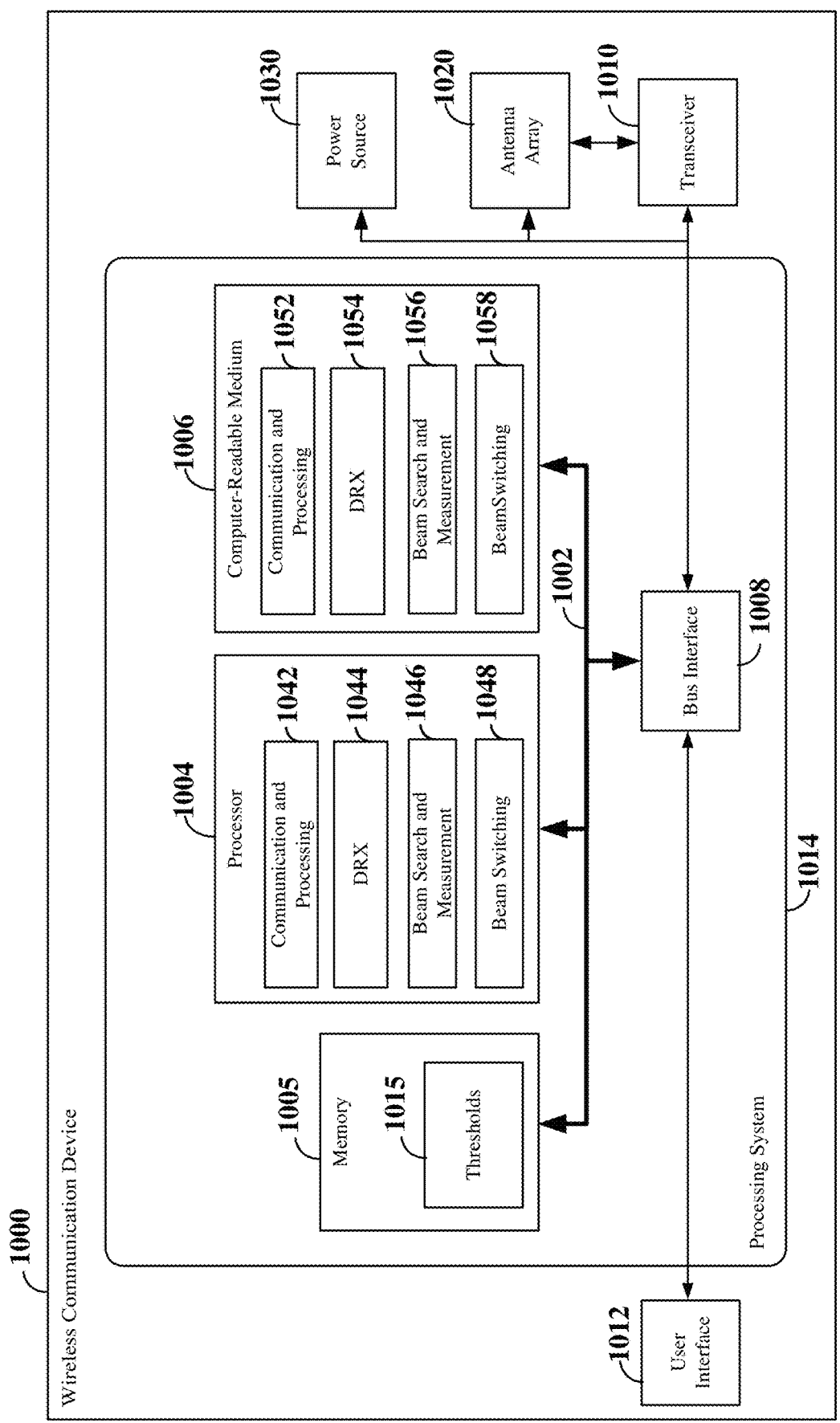
FIG. 10 is a block diagram illustrating an example of a hardware implementation for a wireless communication device employing a processing system according to some aspects.

FIG. 10 is a conceptual diagram illustrating an example of a hardware implementation for an exemplary wireless communication device employing a processing system 1014. For example, the wireless communication device 1000 may be a UE or other scheduled entity as illustrated in any one or more of FIGS. 1, 2, 5, 8 and/or 9.

The wireless communication device 1000 may be implemented with a processing system 1014 that includes one or more processors 1004. Examples of processors 1004 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless communication device 1000 may be configured to perform any one or more of the functions described herein. That is, the processor 1004, as utilized in a wireless communication device 1000, may be used to implement any one or more of the processes described below in connection with FIG. 11.

The processor 1004 may in some instances be implemented via a baseband or modem chip and in other implementations, the processor 1004 may itself comprise a number of devices distinct and different from a baseband or modem chip (e.g., in such scenarios is may work in concert to achieve embodiments discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 communicatively couples together various circuits including one or more processors (represented generally by the processor 1004), a memory 1005, and computer-readable media (represented generally by the computer-readable medium 1006). The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatus over a transmission medium (e.g., air interface). A user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described below for any particular apparatus. The computer-readable medium 1006 and the memory 1005 may also be used for storing data that is manipulated by the processor 1004 when executing software.

One or more processors 1004 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1006.

The computer-readable medium 1006 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1006 may reside in the processing system 1014, external to the processing system 1014, or distributed across multiple entities including the processing system 1014. The computer-readable medium 1006 may be embodied in a computer program product. In some examples, the computer-readable medium 1006 may be part of the memory 1005. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1004 may include circuitry configured for various functions. For example, the processor 1004 may include communication and processing circuitry 1042, configured to communicate with a RAN node (e.g., a base station, such as a gNB). In some examples, the communication and processing circuitry 1042 may include one or more hardware components that provide the physical structure that performs processes related to wireless communication (e.g., signal reception and/or signal transmission) and signal processing (e.g., processing a received signal and/or processing a signal for transmission).

In some examples, the communication and processing circuitry 1042 may be configured to receive and process downlink beamformed signals at a mmWave frequency or a sub-6 GHz frequency via the transceiver 1010 and an antenna array 1020. For example, the communication and processing circuitry 1042 may be configured to receive a respective reference signal on each of a plurality of downlink beams from the RAN node during a beam sweep. The communication and processing circuitry 1042 may further be configured to receive a paging message from the RAN node. The communication and processing circuitry 1042 may further be configured to execute communication and processing software 1052 stored in the computer-readable medium 1006 to implement one or more of the functions described herein.

The processor 1004 may further include DRX circuitry 1044, configured to implement a DRX idle mode on the wireless communication device 1000. In the DRX idle mode, the DRX circuitry 1044 can determine a DRX cycle including a DRX ON duration and a DRX OFF duration. Upon entering the DRX ON duration at a system time corresponding to a start of the DRX ON duration, the DRX circuitry 1044 may be configured to wake-up the wireless communication device 1000. For example, the DRX circuitry 1044 may be configured to control a power source 1030 to perform a power-up operation of one or more components of the wireless communication device 1000, such as the transceiver 1010 and antenna array 1020, to enable reception of the beam reference signals and/or a paging message in the DRX ON duration. At the end of the DRX ON duration at a system time corresponding to a start of the DRX OFF duration, the DRX circuitry 1044 may further be configured to control the power source 1030 to perform a power-down operation of the one or more components of the wireless communication device 1000 to enter a sleep mode. The DRX circuitry 1044 may further be configured to execute DRX software 1054 stored in the computer-readable medium 1006 to implement one or more of the functions described herein.

The processor 1004 may further include beam search and measurement circuitry 1046, configured to control the antenna array 1020 and transceiver 1010 to search for and identify a plurality of downlink beams during a downlink beam sweep. The downlink beam sweep may occur, for example, during the DRX ON duration of the DRX cycle. The beam search and measurement circuitry 1046 may further be configured to measure a respective RSRP or other suitable beam measurement (e.g., SINR or RSRQ) on each of the plurality of identified downlink beams during the downlink beam sweep. The beam search and measurement circuitry 1046 may further be configured to execute beam search and measurement software 1056 stored in the computer-readable medium 1006 to implement one or more of the functions described herein.

The processor 1004 may further include beam switching circuitry 1048, configured to determine whether to perform a beam switch. In some examples, the beam switching circuitry 1048 may be configured to compare the respective RSRP (or other beam measurement) measured for each of the plurality of downlink beams to identify the downlink beam having the highest measured RSRP (or other beam measurement). The beam switching circuitry 1048 may further be configured to identify a previous serving downlink beam (a first downlink beam) previously utilized by the wireless communication device 1000 as the serving downlink beam in the immediately prior DRX cycle. In examples in which the first downlink beam has the highest RSRP, the beam switching circuitry 1048 may decide to not perform a beam switch. However, in examples in which a second downlink beam different than the first downlink beam has the highest RSRP, the beam switching circuitry 1048 may further compare the RSRP (e.g., a first RSRP) of the first downlink beam with the RSRP (e.g., a second RSRP) of the second downlink beam to determine whether to perform the beam switch.

For example, the beam switching circuitry 1048 may be configured to calculate a difference between the second RSRP and the first RSRP and to determine to perform the beam switch when the difference between the second RSRP and the first RSRP is greater than a first threshold (e.g., a beam difference threshold). The beam switching circuitry 1048 may further be configured to maintain the first downlink beam as the serving downlink beam and not perform a beam switch when the difference between the RSRPs of the first and second downlink beams is less than the beam difference threshold.

When the beam switching circuitry 1048 determines to perform a beam switch, the beam switching circuitry 1048 may further be configured to select the timing of the beam switch based on the criticality of the beam switch. In some examples, the beam switching circuitry 1048 may be configured to determine that the beam switch is critical when the RSRP of the first downlink beam is below a second threshold (e.g., an absolute threshold). The beam switching circuitry 1048 can further determine that the beam switch is non-critical when the RSRP of the first downlink beam is above the absolute threshold. Each of the thresholds 1015 (e.g., the first and second thresholds) may be maintained, for example, in memory 1005.

For a non-critical beam switch, the beam switching circuitry 1048 may further be configured to perform the beam switch from the first downlink beam to the second downlink beam after a paging time window in the DRX ON duration within which the communication and processing circuitry 1042 may be configured to receive a paging message from the RAN node. For a critical beam switch, the beam switching circuitry 1048 may further be configured to perform the beam switch from the first downlink beam to the second downlink beam during the paging time window. In the critical beam switch timing scenario, the communication and processing circuitry 1042 may miss a paging message that may be transmitted from the RAN node. In either the critical or non-critical beam switch timing scenario, the beam switching circuitry 1048 may be configured to control the antenna array 1020 and transceiver 1010 to switch from the first downlink beam to the second downlink beam as the serving downlink beam. The beam switching circuitry 1048 may further be configured to execute beam switching software 1058 stored in the computer-readable medium 1006 to implement one or more of the functions described herein.

Figure 11:
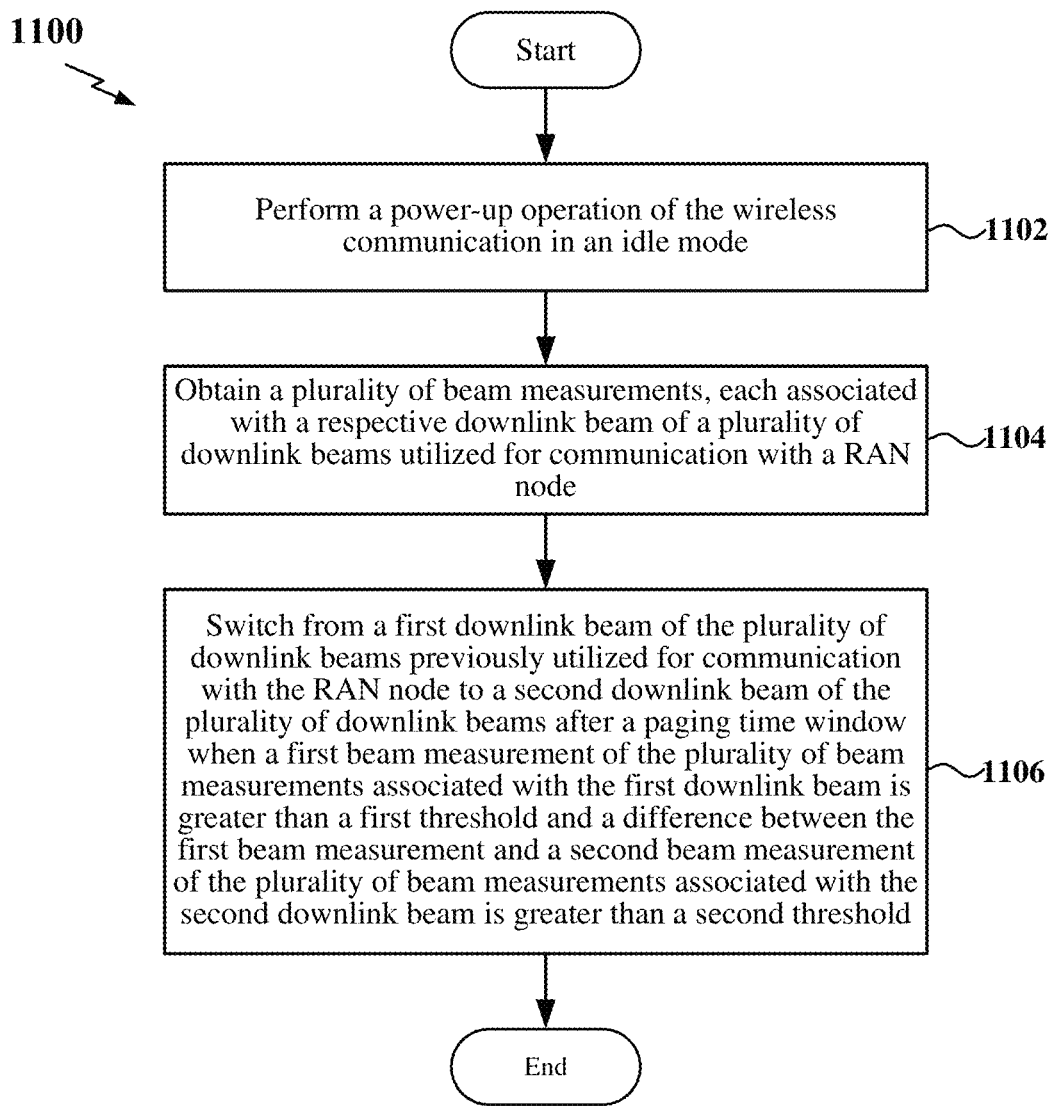
FIG. 11 is a flow chart of an exemplary method for a wireless communication device to determine the timing of a beam switch based on the criticality of the beam switch according to some aspects.

FIG. 11 is a flow chart 1100 of a method for a wireless communication device to determine the timing of a beam switch based on the criticality of the beam switch according to some aspects. As described below, some or all illustrated features may be omitted in a particular implementation within the scope of the present disclosure, and some illustrated features may not be required for implementation of all embodiments. In some examples, the method may be performed by the wireless communication device 1000, as described above and illustrated in FIG. 10, by a processor or processing system, or by any suitable means for carrying out the described functions.

At block 1102, the wireless communication device may perform a power-up operation of the wireless communication in an idle mode. In some examples, the power-up operation may be performed during a DRX cycle. For example, the wireless communication device may wake-up and perform the power-up operation upon entering a DRX ON duration of the DRX cycle. For example, the DRX circuitry 1044 shown and described above in connection with FIG. 10 may perform the power-up operation.

At block 1104, the wireless communication device may obtain a plurality of beam measurements, each associated with a respective downlink beam of a plurality of downlink beams utilized for communication with a radio access network (RAN) node (e.g., a base station, such as a gNB). In some examples, the wireless communication device may search for the plurality of downlink beams upon completing the power-up operation and then measure a beam reference signal on each of the plurality of beams to obtain the plurality of beam measurements. In some examples, the beam reference signal includes an SSB and the plurality of beam measurements include RSRP measurements, SINR measurements, or RSRQ measurement. For example, the RAN node may transmit a beam reference signal (e.g., SSB) on each of the plurality of downlink beams during a beam sweep to the wireless communication device. The wireless communication device may then identify and perform beam measurements on each of the plurality of downlink beams. For example, the communication and processing circuitry 1042, together with the beam search and measurement circuitry 1046, antenna array 1020, and transceiver 1010, shown and described above in connection with FIG. 10 may obtain the plurality of beam measurements.

At block 1106, the wireless communication device may switch from a first downlink beam of the plurality of downlink beams previously utilized for communication with the RAN node to a second downlink beam of the plurality of downlink beams after a paging time window when a first beam measurement of the plurality of beam measurements associated with the first downlink beam is greater than a first threshold and a difference between the first beam measurement and a second beam measurement of the plurality of beam measurements associated with the second downlink beam is greater than a second threshold. In some examples, the second beam measurement of the second downlink beam is higher than the first beam measurement of the first downlink beam. In some examples, the second threshold is selected by the wireless communication device (e.g., defined on the wireless communication device or selected based on, for example, current channel conditions). For example, the beam switching circuitry 1048 shown and described above in connection with FIG. 10 may switch from the first downlink beam to the second downlink beam after the paging time window.

Figure 12:
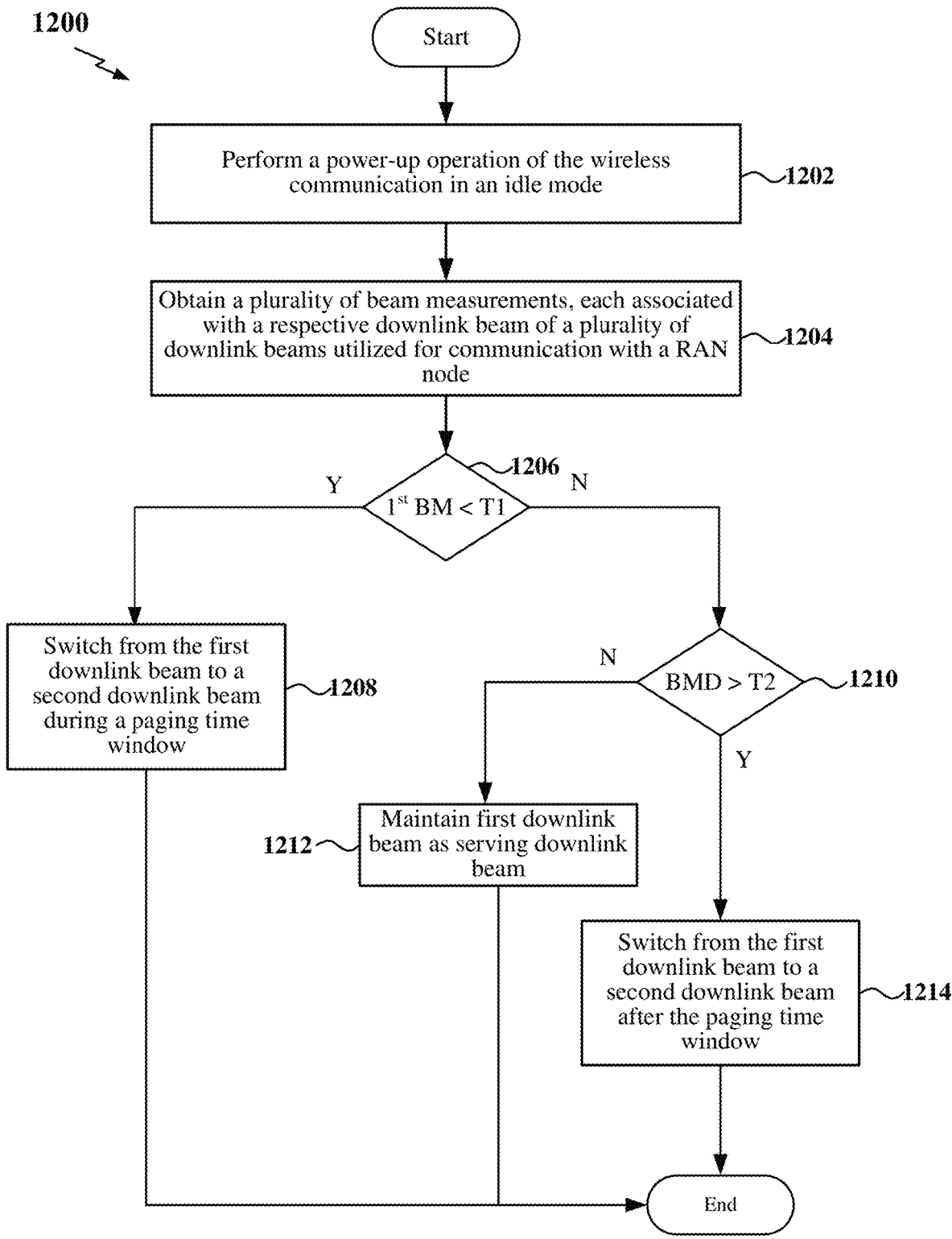
FIG. 12 is a flow chart of an exemplary method for a wireless communication device to decide whether to perform a beam switch according to some aspects.

FIG. 12 is a flow chart 1200 of a method for a wireless communication device to decide whether to perform a beam switch according to some aspects. As described below, some or all illustrated features may be omitted in a particular implementation within the scope of the present disclosure, and some illustrated features may not be required for implementation of all embodiments. In some examples, the method may be performed by the wireless communication device 1000, as described above and illustrated in FIG. 10, by a processor or processing system, or by any suitable means for carrying out the described functions.

At block 1202, the wireless communication device may perform a power-up operation of the wireless communication in an idle mode. In some examples, the power-up operation may be performed during a DRX cycle. For example, the wireless communication device may wake-up and perform the power-up operation upon entering a DRX ON duration of the DRX cycle. For example, the DRX circuitry 1044 shown and described above in connection with FIG. 10 may perform the power-up operation.

At block 1204, the wireless communication device may obtain a plurality of beam measurements, each associated with a respective downlink beam of a plurality of downlink beams utilized for communication with a radio access network (RAN) node (e.g., a base station, such as a gNB). In some examples, the wireless communication device may search for the plurality of downlink beams upon completing the power-up operation and then measure a beam reference signal on each of the plurality of beams to obtain the plurality of beam measurements. In some examples, the beam reference signal includes an SSB and the plurality of beam measurements include RSRP measurements, SINR measurements, or RSRQ measurement. For example, the RAN node may transmit a beam reference signal (e.g., SSB) on each of the plurality of downlink beams during a beam sweep to the wireless communication device. The wireless communication device may then identify and perform beam measurements on each of the plurality of downlink beams. For example, the communication and processing circuitry 1042, together with the beam search and measurement circuitry 1046, antenna array 1020, and transceiver 1010, shown and described above in connection with FIG. 10 may obtain the plurality of beam measurements.

At block 1206, the wireless communication device may determine whether a first beam measurement ($1^{st}$ BM) of the plurality of beam measurements associated with a first downlink beam of the plurality of downlink beams previously utilized for communication with the RAN node is less than a first threshold (T1). In some examples, T1 may represent a beam measurement value (e.g., RSRP value) at which a successful page decode attempt is not possible. In addition, T2 may be defined on the wireless communication device. For example, the beam switching circuitry 1048 shown and described above in connection with FIG. 10 may determine whether the first beam measurement is less than T1.

When the first beam measurement of the first downlink beam is less than T1 (Y branch of block 1206), at block 1208, the wireless communication device may switch from the first downlink beam to a second downlink beam of the plurality of downlink beams during a paging time window of the wireless communication device. In some examples, the wireless communication device may miss a page during the paging time window when switching from the first downlink beam to the second downlink beam occurs during the paging time window. In some examples, a second beam measurement of the second downlink beam is higher than the first beam measurement of the first downlink beam and is above T1. For example, the beam switching circuitry 1048 shown and described above in connection with FIG. 10 may switch from the first downlink beam to the second downlink beam during the paging time window.

When the first beam measurement of the first downlink beam is greater than T1 (N branch of block 1206), at block 1210, the wireless communication device may determine whether a difference (beam measurement difference (BMD)) between the first beam measurement and the second beam measurement associated with the second downlink beam is greater than a second threshold (T2). In some examples, the second beam measurement is a highest beam measurement from among the plurality of beam measurements. In some examples, T2 is selected by the wireless communication device (e.g., defined on the wireless communication device or selected based on, for example, current channel conditions). For example, the beam switching circuitry 1048 shown and described above in connection with FIG. 10 may determine whether the beam measurement difference is greater than T2.

When the beam measurement difference is less than T2 (N branch of block 1210), at block 1212, the wireless communication device may maintain the first downlink beam as serving downlink beam. As such, the wireless communication device may not perform a beam switch. For example, the beam switching circuitry 1048 shown and described above in connection with FIG. 10 may maintain the currently serving downlink beam.

When the beam measurement difference is greater than T2 (Y branch of block 1210), at block 1214, the wireless communication device may switch from the first downlink beam to the second downlink beam after the paging time window. In some examples, the second beam measurement is a highest beam measurement from among the plurality of beam measurements. For example, the beam switching circuitry 1048 shown and described above in connection with FIG. 10 may switch from the first downlink beam to the second downlink beam after the paging time window.

The processes shown in FIGS. 11-12 may include additional aspects, such as any single aspect or any combination of aspects described below and/or in connection with one or more other processes described elsewhere herein.

In a first aspect, a wireless communication device (e.g., a UE) may perform a power-up operation of the wireless communication device in an idle mode. The wireless communication device may further obtain a plurality of beam measurements, each associated with a respective downlink beam of a plurality of downlink beams utilized for communication with a radio access network (RAN) node (e.g., a base station). The wireless communication device may further switch from a first downlink beam of the plurality of downlink beams previously utilized for communication with the RAN node to a second downlink beam of the plurality of downlink beams after a paging time window when a first beam measurement of the plurality of beam measurements associated with the first downlink beam is greater than a first threshold and a difference between the first beam measurement and a second beam measurement of the plurality of beam measurements associated with the second downlink beam is greater than a second threshold.

In a second aspect, alone or in combination with the first aspect, the plurality of beam measurements may be obtained by searching for the plurality of downlink beams upon completing the power-up operation and measuring a beam reference signal on each of the plurality of downlink beams to obtain the plurality of beam measurements.

In a third aspect, alone or in combination with one or more of the first and second aspects, the beam reference signal includes a synchronization signal block (SSB).

In a fourth aspect, alone or in combination with one or more of the first through third aspects, the plurality of beam measurements include reference signal received power (RSRP) measurements, signal-to-interference-plus-noise (SINR) measurements, or reference signal received quality (RSRQ) measurements.

In a fifth aspect, alone or in combination with one or more of the first through fourth aspects, the wireless communication device performs the power-up operation during a discontinuous reception (DRX) cycle.

In a sixth aspect, alone or in combination with one or more of the first through fifth aspects, the wireless communication device selects the second threshold.

In a seventh aspect, alone or in combination with one or more of the first through sixth aspects, the second beam measurement has a highest beam measurement from among the plurality of beam measurements.

In an eighth aspect, alone or in combination with one or more of the first through seventh aspects, the wireless communication device may switch from the first downlink beam to the second downlink beam during the paging time window when the first beam measurement is less than the first threshold.

In a ninth aspect, alone or in combination with one or more of the first through eighth aspects, the wireless communication device may miss a page during the paging time window when switching from the first downlink beam to the second downlink beam occurs during the paging time window.

In a tenth aspect, alone or in combination with one or more of the first through ninth aspects, the wireless communication device may maintain the first downlink beam as a serving downlink beam when the first beam measurement is greater than the first threshold and the difference between the first beam measurement and the second beam measurement is less than the second threshold.

In one configuration, a wireless communication device includes means for performing a power-up operation in an idle mode, means for obtaining a plurality of beam measurements, each associated with a respective downlink beam of a plurality of downlink beams, and means for switching from a first downlink beam of the plurality of downlink beams previously utilized for communication with the RAN node to a second downlink beam of the plurality of downlink beams after a paging time window when a first beam measurement of the plurality of beam measurements associated with the first downlink beam is greater than a first threshold and a difference between the first beam measurement and a second beam measurement of the plurality of beam measurements associated with the second downlink beam is greater than a second threshold.

In one aspect, the aforementioned means for performing a power-up operation in an idle mode, means for obtaining a plurality of beam measurements, and means for switching from a first downlink beam of the plurality of downlink beams previously utilized for communication with the RAN node to a second downlink beam of the plurality of downlink beams after a paging time window when a first beam measurement of the plurality of beam measurements associated with the first downlink beam is greater than a first threshold and a difference between the first beam measurement and a second beam measurement of the plurality of beam measurements associated with the second downlink beam is greater than a second threshold may be the processor(s) 1004 shown in FIG. 10 configured to perform the functions recited by the aforementioned means. For example, the aforementioned means for performing a power-up operation in an idle mode may include the DRX circuitry 1044 and power source 1030 shown in FIG. 10. As another example, the aforementioned means for obtaining a plurality of beam measurements may include the communication and processing circuitry 1042, beam search and measurement circuitry 1046, transceiver 1010, and antenna array 1020 shown in FIG. 10. As another example, the aforementioned means for switching from a first downlink beam of the plurality of downlink beams previously utilized for communication with the RAN node to a second downlink beam of the plurality of downlink beams after a paging time window when a first beam measurement of the plurality of beam measurements associated with the first downlink beam is greater than a first threshold and a difference between the first beam measurement and a second beam measurement of the plurality of beam measurements associated with the second downlink beam is greater than a second threshold may include the beam switching circuitry 1048 shown in FIG. 10. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 4, 5, and 8-10 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication at a wireless communication device in a wireless communication network, the method comprising:
    performing a power-up operation of the wireless communication device in an idle mode;
    obtaining a plurality of beam measurements, each beam measurement being associated with a respective downlink beam of a plurality of downlink beams used for communication with a radio access network (RAN) node; and
    switching from a first downlink beam of the plurality of downlink beams previously used for communication with the RAN node to a second downlink beam of the plurality of downlink beams after a paging time window when a first beam measurement of the plurality of beam measurements associated with the first downlink beam is greater than a first threshold and a difference between the first beam measurement and a second beam measurement of the plurality of beam measurements associated with the second downlink beam is greater than a second threshold.

2. The method of claim 1, wherein the obtaining the plurality of beam measurements further comprises:
    searching for the plurality of downlink beams upon completing the power-up operation; and
    measuring a beam reference signal on each of the plurality of downlink beams to obtain the plurality of beam measurements.

3. The method of claim 2, wherein the beam reference signal comprises a synchronization signal block (SSB).

4. The method of claim 2, wherein the plurality of beam measurements comprise reference signal received power (RSRP) measurements, signal-to-interference-plus-noise (SINR) measurements, or reference signal received quality (RSRQ) measurements.

5. The method of claim 1, wherein performing the power-up operation further comprises:
    performing the power-up operation during a discontinuous reception (DRX) cycle.

6. The method of claim 1, further comprising:
    selecting the second threshold by the wireless communication device.

7. The method of claim 1, wherein the second beam measurement comprises a highest beam measurement from among the plurality of beam measurements.

8. The method of claim 1, further comprising:
    switching from the first downlink beam to the second downlink beam during the paging time window when the first beam measurement is less than the first threshold.

9. The method of claim 8, further comprising:
    missing a page during the paging time window when switching from the first downlink beam to the second downlink beam occurs during the paging time window.

10. The method of claim 1, further comprising:
    maintaining the first downlink beam as a serving downlink beam when the first beam measurement is greater than the first threshold and the difference between the first beam measurement and the second beam measurement is less than the second threshold.

11. A wireless communication device in a wireless communication network, comprising:
    a wireless transceiver configured to receive a plurality of downlink beams used for communication with a radio access network (RAN) node;
    a memory comprising instructions; and
    a processor configured to execute the instructions to:
        perform a power-up operation of the wireless communication device in an idle mode;
        obtain a plurality of beam measurements, each beam measurement being associated with a respective downlink beam of the plurality of downlink beams; and
        switch from a first downlink beam of the plurality of downlink beams previously used for communication with the RAN node to a second downlink beam of the plurality of downlink beams after a paging time window when a first beam measurement of the plurality of beam measurements associated with the first downlink beam is greater than a first threshold and a difference between the first beam measurement and a second beam measurement of the plurality of beam measurements associated with the second downlink beam is greater than a second threshold.

12. The wireless communication device of claim 11, wherein the processor is further configured to execute the instructions to:
    search for the plurality of downlink beams upon completing the power-up operation; and
    measure a beam reference signal on each of the plurality of downlink beams to obtain the plurality of beam measurements.

13. The wireless communication device of claim 11, wherein the processor is further configured to execute the instructions to:
    perform the power-up operation during a discontinuous reception (DRX) cycle.

14. The wireless communication device of claim 11, wherein the processor is further configured to execute the instructions to:
    select the second threshold.

15. The wireless communication device of claim 11, wherein the second beam measurement comprises a highest beam measurement from among the plurality of beam measurements.

16. The wireless communication device of claim 11, wherein the processor is further configured to execute the instructions to:
switch from the first downlink beam to the second downlink beam during the paging time window when the first beam measurement is less than the first threshold.

17. The wireless communication device of claim 16, wherein the processor is further configured to execute the instructions to:
miss a page during the paging time window when switching from the first downlink beam to the second downlink beam occurs during the paging time window.

18. The wireless communication device of claim 11, wherein the processor is further configured to execute the instructions to:
maintain the first downlink beam as a serving downlink beam when the first beam measurement is greater than the first threshold and the difference between the first beam measurement and the second beam measurement is less than the second threshold.

19. A wireless communication device in a wireless communication network, comprising:
means for performing a power-up operation of the wireless communication device in an idle mode;
means for obtaining a plurality of beam measurements, each beam measurement being associated with a respective downlink beam of a plurality of downlink beams used for communication with a radio access network (RAN) node; and
means for switching from a first downlink beam of the plurality of downlink beams previously used for communication with the RAN node to a second downlink beam of the plurality of downlink beams after a paging time window when a first beam measurement of the plurality of beam measurements associated with the first downlink beam is greater than a first threshold and a difference between the first beam measurement and a second beam measurement of the plurality of beam measurements associated with the second downlink beam is greater than a second threshold.

20. The wireless communication device of claim 19, wherein the means for performing the power-up operation further comprises:
means for performing the power-up operation during a discontinuous reception (DRX) cycle.

21. The wireless communication device of claim 19, further comprising:
means for selecting the second threshold by the wireless communication device.

22. The wireless communication device of claim 19, further comprising:
means for switching from the first downlink beam to the second downlink beam during the paging time window when the first beam measurement is less than the first threshold.

23. The wireless communication device of claim 22, further comprising:
means for missing a page during the paging time window when switching from the first downlink beam to the second downlink beam occurs during the paging time window.

24. The wireless communication device of claim 19, further comprising:
means for maintaining the first downlink beam as a serving downlink beam when the first beam measurement is greater than the first threshold and the difference between the first beam measurement and the second beam measurement is less than the second threshold.

25. An apparatus for wireless communication, comprising:
a memory comprising instructions; and
a processor configured to execute the instructions to:
perform a power-up operation of the wireless communication device in an idle mode;
obtain a plurality of beam measurements, each associated with a respective downlink beam of a plurality of downlink beams used for communication with a radio access network (RAN) node; and
switch from a first downlink beam of the plurality of downlink beams previously used for communication with the RAN node to a second downlink beam of the plurality of downlink beams after a paging time window when a first beam measurement of the plurality of beam measurements associated with the first downlink beam is greater than a first threshold and a difference between the first beam measurement and a second beam measurement of the plurality of beam measurements associated with the second downlink beam is greater than a second threshold.

26. The apparatus of claim 25, wherein the processor is further configured to execute the instructions to:
perform the power-up operation during a discontinuous reception (DRX) cycle.

27. The apparatus of claim 25, wherein the processor is further configured to execute the instructions to:
select the second threshold by the wireless communication device.

28. The apparatus of claim 25, wherein the processor is further configured to execute the instructions to:
switch from the first downlink beam to the second downlink beam during the paging time window when the first beam measurement is less than the first threshold.

29. The apparatus of claim 28, wherein the processor is further configured to execute the instructions to:
miss a page during the paging time window when switching from the first downlink beam to the second downlink beam occurs during the paging time window.

30. The apparatus of claim 25, wherein the processor is further configured to execute the instructions to:
maintain the first downlink beam as a serving downlink beam when the first beam measurement is greater than the first threshold and the difference between the first beam measurement and the second beam measurement is less than the second threshold.

* * * * *